US010855526B2

(12) United States Patent
Yoshida et al.

(10) Patent No.: US 10,855,526 B2
(45) Date of Patent: Dec. 1, 2020

(54) SENSOR REGISTRATION METHOD, SENSOR REGISTRATION SYSTEM, AND RELAY DEVICE

(71) Applicant: Yokogawa Electric Corporation, Tokyo (JP)

(72) Inventors: Yusaku Yoshida, Tokyo (JP); Shunsuke Baba, Tokyo (JP); Daisuke Ikegami, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 160 days.

(21) Appl. No.: 15/888,295

(22) Filed: Feb. 5, 2018

(65) Prior Publication Data

US 2018/0227171 A1 Aug. 9, 2018

(30) Foreign Application Priority Data

Feb. 6, 2017 (JP) ................................ 2017-019708

(51) Int. Cl.
*H04L 12/24* (2006.01)
*G05B 19/418* (2006.01)
*G05B 19/042* (2006.01)
*H04B 7/14* (2006.01)
*H04L 29/08* (2006.01)

(52) U.S. Cl.
CPC ...... *H04L 41/0803* (2013.01); *G05B 19/0423* (2013.01); *G05B 19/41845* (2013.01); *H04B 7/14* (2013.01); *H04L 67/10* (2013.01); *H04L 67/12* (2013.01); *G05B 2219/25098* (2013.01); *Y02P 90/16* (2015.11)

(58) Field of Classification Search
None
See application file for complete search history.

(56) References Cited

U.S. PATENT DOCUMENTS

| 5,982,869 A * | 11/1999 | Lozano ..................... H04Q 3/66 379/220.01 |
| 2003/0174717 A1* | 9/2003 | Zabarski ................. H04L 45/00 370/401 |
| 2005/0204061 A1* | 9/2005 | Farchmin ........... G05B 19/0423 709/245 |
| 2006/0161645 A1 | 7/2006 | Moriwaki et al. |

(Continued)

FOREIGN PATENT DOCUMENTS

| CN | 1828642 A | 9/2006 |
| EP | 1 574 922 A2 | 9/2005 |

(Continued)

*Primary Examiner* — Thomas J Dailey
(74) *Attorney, Agent, or Firm* — Sughrue Mion, PLLC

(57) ABSTRACT

A sensor registration method according to one aspect of the present invention includes generating association information associating port information with sensor information, the port information identifying a connection port of a first communication device to which a sensor is connected, the sensor information including a type of the sensor, converting the association information to have a predetermined format, transmitting the converted association information to an information processing device configured to process data obtained from the sensor, and registering the sensor in the information processing device by storing the converted association information into the information processing device.

15 Claims, 12 Drawing Sheets

(56) References Cited

U.S. PATENT DOCUMENTS

| | | | |
|---|---|---|---|
| 2006/0202834 A1 | 9/2006 | Moriwaki | |
| 2007/0268128 A1* | 11/2007 | Swanson | H04Q 9/00 340/539.22 |
| 2008/0056261 A1* | 3/2008 | Osborn | H04L 12/2834 370/392 |
| 2008/0068156 A1* | 3/2008 | Shimokawa | H04W 84/18 340/539.22 |
| 2015/0051930 A1 | 2/2015 | Yamaguchi et al. | |
| 2017/0149614 A1* | 5/2017 | Zheng | H04L 41/12 |

FOREIGN PATENT DOCUMENTS

| | | |
|---|---|---|
| EP | 3 104 315 A1 | 12/2016 |
| GB | 2531580 A | 4/2016 |
| JP | 2006-195788 A | 7/2006 |
| JP | 2012-523038 A | 9/2012 |
| JP | 5792891 B2 | 10/2015 |
| WO | 2010/120440 A2 | 10/2010 |

\* cited by examiner

FIG. 4

DEVICE INFORMATION REGISTRATION SCREEN

DEVICE ID [SL1 ▼]  [B1 DEVICE ID AND GPS ACQUISITION]

CONNECTION DESTINATION [SL2 ▼]

GPS INFORMATION [HL1]

| | PORT NUMBER OR CONSTANT, etc. | SENSOR INFORMATION, etc. |
|---|---|---|
| FIRST PROPERTY | [SL3 ▼] | [SL4 ▼] |
| SECOND PROPERTY | [SL5 ▼] | [SL6 ▼] |
| THIRD PROPERTY | [SL7 ▼] | [SL8 ▼] |

[B2 ADD PROPERTY]   [B3 SAVE]

SENSOR REGISTRATION METHOD, SENSOR REGISTRATION SYSTEM, AND RELAY DEVICE

BACKGROUND OF THE INVENTION

Field of the Invention

The present invention relates to a sensor registration method, a sensor registration system, and a relay device.

The present application claims priority based on Japanese patent application 2017-19708, filed on Feb. 6, 2017 and includes herein by reference the content thereof.

Description of Related Art

Various engineering systems have been constructed in plants, factories, or the like to realize advanced automatic operations. The engineering systems constructed in plants or the like include, for example, a distributed control system (DCS), a manufacturing execution system (MES), a plant information management system (PIMS), and an enterprise resource planning (ERP) system which is a core business system.

In the related art, such engineering systems were mostly realized using devices installed in plants such as a programmable logic controller (PLC), a factory automation (FA) computer, a general purpose desktop computer, or a server device. In recent years, with the progress of communication technologies, some of the engineering systems are realized by cloud computing via a network.

Published Japanese Translation No. 2012-523038 of the PCT International Publication discloses cloud computing for industrial automation and production systems. Japanese Patent No. 5792891 discloses an exemplary technology for providing, by cloud computing, a development environment for developing application programs used in a cloud computing environment.

Various types of sensors for measuring various process values (for example, temperature, pressure, flow rate, or the like) are installed in the plants or the like described above. With the spread of cloud computing, measurement results of the sensors are sometimes managed in a cloud server.

In applications for other than plants, for example, in rivers, infrastructures such as roads, agricultural fields such as crops and livestock, weather, health management, transportation, or the like, there is an increasing demand for installing sensors to measure various physical quantities and the chance to perform sensor management, statistical analysis of data, or the like in a cloud is also on the rise. A cloud server is a server constructed in a cloud environment on the premise that it is used through a network such as the Internet. A cloud server is made up of one or more electronic devices, terminal devices, servers, general-purpose personal computers, and the like which constitute cloud computing. Cloud computing is defined in the NIST definition of cloud computing (SP 800-145) available at www.ipa.gajp/files/000025366.pdf).

SUMMARY

When such sensors are used in a system realized by cloud computing, it is necessary to register identification information of the sensors in advance in a cloud server. Thus, sensors whose identification information cannot be registered in advance in the cloud server (for example, sensors made by other companies) cannot be used in the system. In addition, when a plurality of sensors are installed at a site, it is sometimes difficult to determine which sensor is installed at which position.

One aspect of the present invention provides a sensor registration method, a sensor registration system, and a relay device which make unregistered sensors available.

A sensor registration method according to a first aspect of the present invention may include generating association information associating port information with sensor information, the port information identifying a connection port of a first communication device to which a sensor is connected, the sensor information including a type of the sensor, converting the association information to have a predetermined format, transmitting the converted association information to an information processing device configured to process data obtained from the sensor, and registering the sensor in the information processing device by storing the converted association information into the information processing device.

In the above-described sensor registration method, generating the association information may include receiving input of the port information and the sensor information using a communication terminal, and associating the received port information with the received sensor information to generate the association information using the communication terminal.

The above-described sensor registration method may further include communicating, using a relay device configured to relay communication between the first communication device and the information processing device, with the communication terminal to acquire the association information from the communication terminal. The association information may be converted to have a format applicable to registration in the information processing device by the relay device. The converted association information may be transmitted to the information processing device by the relay device.

In the above-described sensor registration method, receiving the input of the port information and the sensor information may include reading first identification information identifying the first communication device using the communication terminal, the first identification information being displayed on the first communication device, acquiring position information of the communication terminal using the communication terminal, displaying a registration page including the first identification information and the position information on the communication terminal, and receiving the input of the port information and the sensor information on the registration page.

The above-described sensor registration method may further include reading second identification information identifying a relay device using the communication terminal, the relay device being configured to relay communication between the first communication device and the information processing device, the second identification information being displayed on the relay device.

The above-described sensor registration method may further include receiving input of a connection destination of the first communication device on the registration page.

In the above-described sensor registration method, the information processing device may be a cloud server connected to the communication terminal and the relay device via a network.

In the above-described sensor registration method, registering the sensor in the information processing device may include associating the second identification information with the first identification information, and associating the first information with the sensor.

A sensor registration system according to a second aspect of the present invention may include an information processing device configured to process data obtained from a sensor, a first communication device having at least one connection port to which the sensor is connected, and a second communication device configured to convert association information to have a predetermined format, the association information associating port information identifying the connection port with sensor information including a type of the sensor, and transmit the converted association information to the information processing device to register the sensor in the information processing device.

In the above-described sensor registration system, the second communication device may be a relay device configured to relay communication between the first communication device and the information processing device. The sensor registration system may further include a communication terminal including a receiver configured to receive input of the port information and the sensor information, a controller configured to associate the received port information with the received sensor information to generate the association information, and a communicator configured to transmit the generated association information to the relay device.

In the above-described sensor registration system, the relay device may include a signal processor configured to convert the association information acquired from the communication terminal to have the predetermined format and transmit the converted association information to the information processing device.

In the above-described sensor registration system, the communication terminal may be configured to read first identification information identifying the first communication device, the first identification information being displayed on the first communication device, acquire position information of the communication terminal, display a registration page including the first identification information and the position information, and receive the input of the port information and the sensor information on the registration page.

In the above-described sensor registration system, the communication terminal may be configured to read second identification information identifying the relay device, the second identification information being displayed on the relay device.

In the above-described sensor registration system, the communication terminal may be configured to receive input of a connection destination of the first communication device on the registration page.

In the above-described sensor registration system, the information processing device may be a cloud server connected to the communication terminal and the relay device via a network.

In the above-described sensor registration system, the information processing device may be configured to associate the second identification information with the first identification information, and associate the first information with the sensor.

A relay device according to a third aspect of the present invention may be configured to relay communication between a first communication device having at least one connection port to which a sensor is connected and an information processing device configured to process data obtained from the sensor, convert association information to have a predetermined format, the association information associating first identification information identifying the connection port with sensor information including a type of the sensor, and transmit the converted association information to the information processing device to register the sensor in the information processing device.

According to the one aspect of the present invention, it is possible to make unregistered sensors available.

BRIEF DESCRIPTION OF THE DRAWINGS

FIG. 4 is a diagram showing a device information registration page W1 according to an embodiment of the present invention.

DETAILED DESCRIPTION OF THE INVENTION

Figure 1:
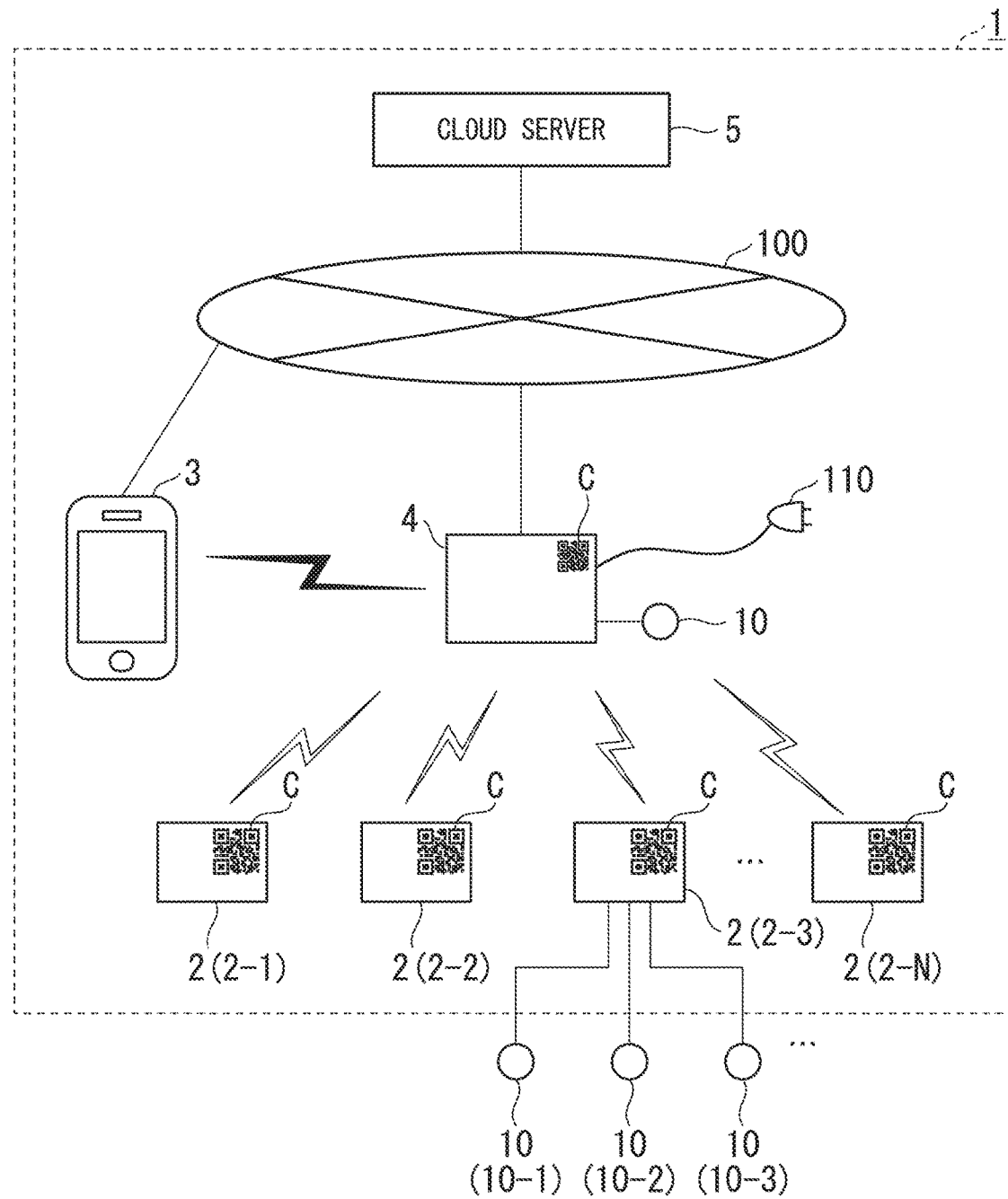
FIG. 1 is a diagram showing an exemplary schematic configuration of a sensor registration system 1 according to an embodiment of the present invention.

Hereinafter, the present invention will be described through embodiments of the present invention but the following embodiments do not limit the invention according to the claims. Not all combinations of features described in the embodiments are necessarily essential to the solution of the invention. In the drawings, the same or similar parts are denoted by the same reference signs and duplicate descriptions will sometimes be omitted. The shapes, sizes, or the like of elements in the drawings may be exaggerated for a clearer explanation.

Throughout the specification, when it is stated that a portion "includes," "has," or "is provided with" an element, it means that the portion may further include other elements rather than excluding other elements unless specifically stated otherwise.

Hereinafter, a registration system according to an embodiment of the present invention will be described with reference to the drawings.

The registration system 1 according to the embodiment of the present invention is a registration system in which, for example, a sensor 10 of which sensor information such as the type or identification information is unknown is registered in a cloud server at a sensor installation site (hereinafter simply referred to as a "site").

FIG. 1 is a diagram showing an exemplary schematic configuration of the sensor registration system 1 according to the embodiment of the present invention. As shown in FIG. 1, the registration system 1 includes a plurality of modules 2 (2-1, 2-2, 2-3, . . . , and 2-N(N: an integer of 1 or more)), a communication terminal 3, a relay device 4, and a cloud server 5. The cloud server 5 may be an example of an "information processing device" in the present invention and the modules 2 may be an example of a "first communication device" in the present invention. A "second communication device" referred to in the claims may be the communication terminal 3 or the relay device 4. Each of the modules 2 and the relay device 4 has an information code C indicating identification information which can uniquely specify the corresponding device.

Each of the plurality of modules 2-1, 2-2, . . . , and 2-N has the same configuration. Each of the plurality of modules 2-1, 2-2, . . . , and 2-N will be simply referred to as a "module 2" when they are not distinguished. Each of the plurality of modules 2-1, 2-2, . . . , and 2-N may not have the same configuration but may represent an individual module. For example, the plurality of modules 2-1, 2-2, . . . , and 2-N may include existing modules.

The module 2 transmits or receives information to or from the relay device 4 by wired or wireless communication with the relay device 4.

Figure 2:
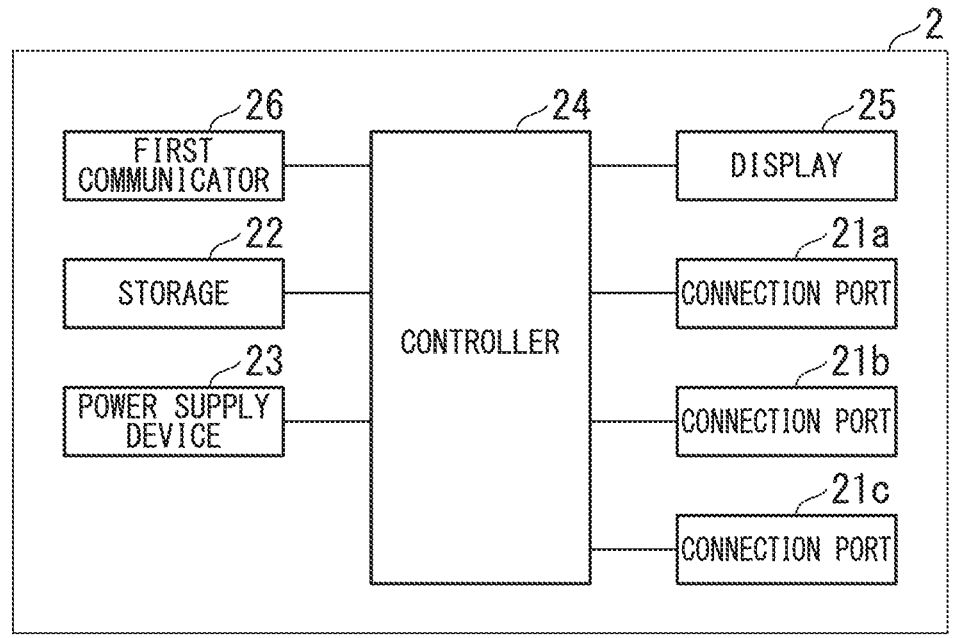
FIG. 2 is a diagram showing an exemplary schematic configuration of a module 2 according to an embodiment of the present invention.

FIG. 2 is a diagram showing an exemplary schematic configuration of the module 2 according to an embodiment of the present invention.

As shown in FIG. 2, the module 2 includes a plurality of connection ports 21 (21a, 21b, and 21c), a storage 22, a power supply device 23, a controller 24, a display 25, and a first communicator 26.

The plurality of connection ports 21 are interfaces to which sensors 10 are connected. The present embodiment will be described with regard to the case in which the module 2 includes three connection ports 21a, 21b, and 21c, but the number of the connection ports is not limited to three. That is, the module 2 need only have at least one connection port to which a sensor 10 is connected. Although a temperature and humidity sensor, a pressure sensor, a flow rate sensor, an image sensor, and the like are considered as examples of the sensors 10, it is not necessary to specify their types as long as they are sensors. These sensors 10 are developed and manufactured by various manufacturers and are introduced or installed at the sites of various users (hereinafter also referred to as "tenants") such as, for example, in rivers, surroundings of rivers, surroundings of lakeside areas, surroundings of water purification plants, surroundings of drainage pumps of factories, production lines, chemical production lines, oil refinery places, or the like. Some sensors 10 connected to the plurality of connection ports 21 may be developed and manufactured by different manufacturers.

Identification information (hereinafter, a "module ID") identifying the module 2 among the plurality of modules 2 (2-1, 2-2, . . . , and 2-N) is stored in the storage 22 of the module 2.

The power supply device 23 supplies power to each part of the module 2. A primary battery or a secondary battery such as a nickel hydride battery or a lithium ion battery can be used as the power supply device 23. Instead of a battery, an electric double-layer capacitor can be used as the power supply device 23. Since the module 2 is driven by power of the power supply device 23 included therein in this manner, the module 2 need not be externally wired to obtain electric power. This eliminates the need for excessive wirings or the like and thus it is possible to reduce installation costs. An external power supply may be used when power consumption cannot be covered by the battery.

The controller 24 stores a measurement value acquired from a sensor 10 connected to a connection port 21 in a storage area of the storage 22 corresponding to the connection port 21. Such data is stored together with time information held in the controller 24 and identification information of the connection port. The controller 24 has a function of performing computation on the measurement value. For example, the controller 24 performs temperature correction of the sensor 10, filtering, or the like. The controller 24 also assigns both a module ID of the module and information identifying the sensor 10 to the measurement value acquired from the sensor 10 connected to the connection port 21 and transmits the resulting measurement value to the relay device 4 wirelessly or by wire. The information identifying the sensor 10 is, for example, information indicating the connection port to which the sensor 10 is connected.

The controller 24 displays image data of the information code C indicating the module ID stored in the storage 22 on the display 25. The information code C may be a two-dimensional matrix type code such as a QR code (registered trademark) or a two-dimensional stack type code or may be a one-dimensional code. The display 25 may be a seal on which the information code C is printed, which may also be printed or engraved directly on the module 2.

The first communicator 26 transmits or receives information to or from the relay device 4 by wired or wireless communication with the relay device 4. Communication lines for this wireless communication include a computer network such as the Internet, a core network of a communication carrier, and various local networks. For example, the first communicator 26 may use a low-power wide area network (LPWAN) or may use ZigBee (registered trademark), WiFi (registered trademark), Bluetooth Low Energy (BLE), or the like which are short-range wireless communication standards.

The communication terminal 3 is a device that can be manipulated by a user.

The communication terminal 3 may be any terminal as long as it is communicable and is, for example, a mobile phone such as a smartphone, a tablet terminal, a personal computer (PC), or the like.

Hereinafter, the communication terminal 3 according to an embodiment of the present invention will be described.

Figure 3:
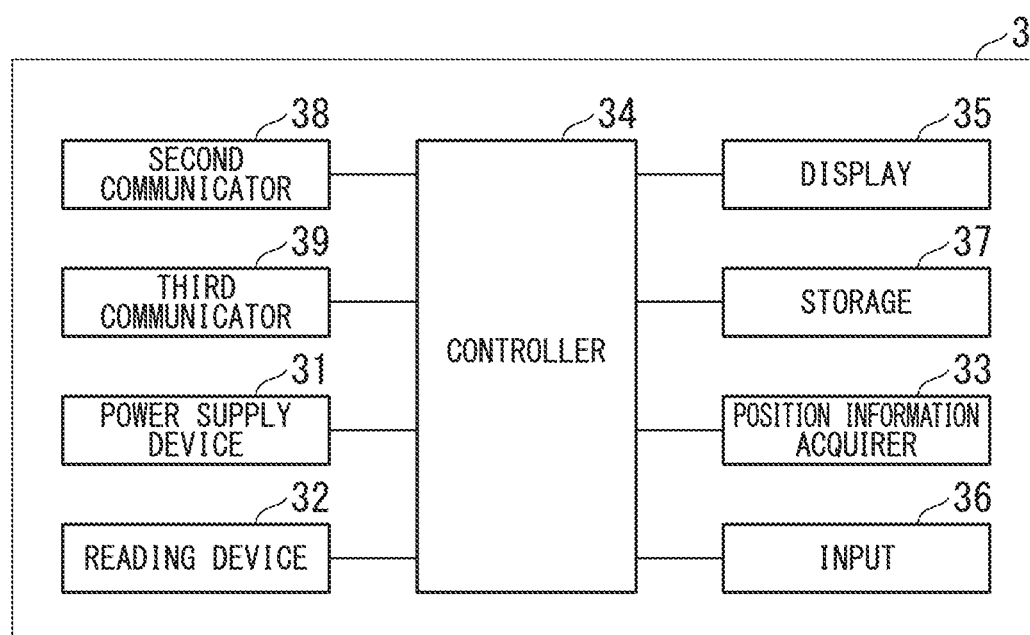
FIG. 3 is a diagram showing an exemplary schematic configuration of a communication terminal 3 according to an embodiment of the present invention.

FIG. 3 is a diagram showing an exemplary schematic configuration of the communication terminal 3 according to the embodiment of the present invention.

As shown in FIG. 3, the communication terminal 3 includes a power supply device 31, a reading device 32, a position information acquirer 33, a controller 34, a display 35, an input 36 (receiver), a storage 37, a second communicator 38, and a third communicator 39.

The power supply device 31 supplies power to each part of the communication terminal 3. A primary battery or a secondary battery such as a nickel hydride battery or a lithium ion battery can be used as the power supply device 31. Instead of a battery, an electric double-layer capacitor can be used as the power supply device 31. Since the communication terminal 3 is driven by power of the power supply device 31 included therein in this manner, the communication terminal 3 need not be externally wired to obtain electric power. This eliminates the need for excessive wirings or the like and thus the communication terminal 3 can be used as an easily portable terminal.

The reading device 32 images an information code C. The reading device 32 then reads identification information from the imaged information code C. For example, when imaging the information code C of the module 2, the reading device 32 reads the module ID of the module 2 from the imaged information code C. When imaging the information code C of the relay device 4, the reading device 32 reads identification information (hereinafter referred to as a "device ID") of the relay device 4 from the imaged information code C.

The position information acquirer 33 acquires position information of the communication terminal 3. For example, the position information acquirer 33 acquires the position information using the Global Positioning System (GPS).

When a device ID and GPS acquisition button B1 is pressed on a device information registration page W1 displayed on the display 35 shown in FIG. 4, the controller 34 starts a page for reading the information code C by the reading device 32 and displays an instruction to capture an image of the information code C, for example, on the display 35 to inform the user of the instruction. Simultaneously with capturing of the identification information (the device ID or the module ID) by the reading device 32, the controller 34 acquires position information through the position information acquirer 33.

The controller 34 displays the identification information captured by the reading device 32 and the position information acquired by the position information acquirer 33 on the device information registration page W1. On the device information registration page W1, the user inputs port information identifying the connection port 21 to which the sensor 10 is connected and sensor information including the type of the sensor 10 to the communication terminal 3. This causes the controller 34 to generate association information which associates the input port information identifying the connection port 21 and the input sensor information including the type of the sensor 10 with each other. That is, on the device information registration page W1, the controller 34 associates a property corresponding to the connection port 21 to which the sensor 10 is connected with the sensor information of the sensor 10 connected to the connection port 21. The sensor information is, for example, the type, the measurement range, the sensitivity, or the like of the sensor 10.

The user inputs information of a connection destination of the module 2 on the device information registration page W1 to designate the relay device 4 to which the module 2 is connected. At this time, the communication terminal 3 transmits information necessary for connection to the selected relay device 4 acquired from connection information of the selected relay device 4 stored in the communication terminal 3 to the module to enable connection to the relay device 4. Any method that can establish a connection with the relay device 4 such as those based on a fixed IP or a DHCP server may be used as a method of allowing the module 2 to connect to the relay device 4.

The controller 34 has a function of copying information input on the device information registration page W1 and pasting it into registration information of another sensor 10 or another module 2. For example, when there are 100 sensors 10 that need to be registered and sensor information of the 100 sensors 10 is identical, the controller 34 has a function of allowing the user to input only sensor information of one sensor 10 and then to copy the input information and collectively input the copied information as sensor information of the remaining 99 sensors. When information on a plurality of sensors 10 and a plurality of modules 2 which the user will input includes identical information, the user uses the collective input function to input the information. This eliminates the need to manually input information for all devices one by one, thereby improving work efficiency.

Hereinafter, the device information registration page W1 according to an embodiment of the present invention will be described in detail. As shown in FIG. 4, the device information registration page W1 has a device ID and GPS acquisition button B1, a property addition button B2, a save button B3, a display field HL1, and selection fields SL1 to SL8.

The device ID and GPS acquisition button B1 is a button manipulated when acquiring identification information and position information of the module 2 or the relay device 4 to which sensors 10 registered as properties are connected.

The identification information read by the reading device 32 is displayed in the selection field SL1. The selection field SL1 is a selection field in which it is possible to select identification information of the module 2 or the relay device 4.

When the information code C has been read by the reading device 32, the position information acquired by the position information acquirer 33 is displayed in the display field HL1.

The selection field SL2 is a selection field in which it is possible to select a device ID which is identification information of a connection destination (for example, the relay device 4) of a device (for example, the module 2) whose identification information is displayed in the selection field SL1.

The selection field SL3 is a selection field in which it is possible to select, for example, a port number or constant of the connection port 21a to which a sensor 10 is connected. The selection field SL4 is a selection field in which it is possible to select sensor information of the sensor 10 connected to the connection port 21a.

The selection field SL5 is a selection field in which it is possible to select, for example, a port number or constant of the connection port 21b to which a sensor 10 is connected. The selection field SL6 is a selection field in which it is possible to select sensor information of the sensor 10 connected to the connection port 21b.

The selection field SL7 is a selection field in which it is possible to select, for example, a port number or constant of the connection port 21c to which a sensor 10 is connected. The selection field SL8 is a selection field in which it is possible to select sensor information of the sensor 10 connected to the connection port 21c.

In this manner, in the selection fields SL3, SL5, and SL7, it is possible to select, for example, respective port numbers of the connection ports 21a to 21c of the sensors 10 connected to the module 2 whose module ID is displayed in the display field SL1. In the selection fields SL4, SL6, and SL8, it is possible to select sensor information of the sensors 10 connected to the connection ports 21a to 21c.

The property addition button B2 is a button manipulated when adding a property. The save button B3 is a button manipulated when saving the information input on the device information registration page W1.

Hereinafter, a method of generating association port information identifying the connection port 21 to which the sensors 10 are connected and the sensor information including the type of the sensors 10 are associated with each other, through the device information registration page W1 will be described in detail.

In this embodiment, properties (first to third properties) corresponding respectively to a plurality of connection ports 21 are linked with the module ID of each module 2. For example, the first property corresponds to the connection port 21a. The second property corresponds to the connection port 21b. The third property corresponds to the connection port 21c.

For example, the user manipulating the communication terminal 3 selects a port number of the connection port 21a through the selection field SL3. The user manipulating the communication terminal 3 selects sensor information of the sensor 10 connected to the connection port 21a through the selection field SL4. Thus, the sensor information of the sensor 10 connected to the connection port 21a is set as the first property of the module ID. The user manipulating the communication terminal 3 selects a port number of the connection port 21b through the selection field SL5. The user manipulating the communication terminal 3 selects sensor information of the sensor 10 connected to the connection port 21b through the selection field SL6. Thus, the sensor information of the sensor 10 connected to the connection port 21b is set as the second property of the module ID. The user manipulating the communication terminal 3 selects a port number of the connection port 21c through the selection field SL7. The user manipulating the communication terminal 3 selects sensor information of the sensor 10 connected to the connection port 21c through the selection field SL8. Thus, the sensor information of the sensor 10 connected to the connection port 21c is set as the third property of the module ID.

An option display button (a button on which a symbol "V" is displayed) is provided at the right end of each of the selection fields SL1 to SL8. This option display button is a button for displaying options in each of the selection fields SL1 to SL8. For example, when an option display button provided in the selection field SL1 is pressed, device IDs, module IDs, or the like are displayed as options of the identification information.

When an option display button provided in the selection field SL2 is pressed, device IDs are displayed as options of the connection destination.

When an option display button provided in each of the selection fields SL3, SL5, and SL7 is pressed, connection ports of the module 2 (or the relay device 4) are displayed as options of the corresponding connection port to which a sensor 10 is connected.

When an option display button provided in each of the selection fields SL4, SL6, and SL8 is pressed, "temperature and humidity sensor," "pressure sensor," "flow sensor," and the like are displayed as options of the type of the sensor 10. When the option display button provided in each of the selection fields SL4, SL6, and SL8 is pressed, options for selecting various values for the sensitivity and range of the type of sensor 10 that has been selected are also displayed. Although selection methods are exemplified in this example, other methods such as those of directly inputting characters may also be performed. The device information registration page W1 shown in FIG. 4 is merely an example and the number and type of the selection fields are arbitrary.

In this manner, the controller 34 sets respective sensor information of the sensors 10 connected to the module 2 of each module ID as properties of the module ID according to manipulations of the user.

The input 36 receives input of port information identifying the connection ports 21 to which the sensors 10 are connected and sensor information including the types of the sensors 10 from the user. That is, the input 36 receives manipulations that the user has performed on the selection fields SL1 to SL8 and the buttons B1 to B3. The input 36 may be a keyboard, a mouse, a touch panel, or a microphone.

Such generated association information is stored in the storage 37 through the controller 34.

The second communicator 38 transmits or receives information to or from the relay device 4 by wireless communication with the relay device 4. Communication lines for this wireless communication include a computer network such as the Internet, a core network of a communication carrier (a large capacity communication line used as a communication center in the network), and various local networks. For example, the second communicator 38 may use a low-power wide area network (LPWAN) or may use ZigBee (registered trademark), WiFi (registered trademark), BLE, or the like which are short-range wireless communication standards.

The controller 34 transmits the association information to the relay device 4 through the second communicator 38.

The third communicator 39 transmits or receives information to or from the cloud server 5 via the communication network 100. The communication network 100 may be a transmission path for wireless communication or a combination of a transmission path for wireless communication and a transmission path for wired communication. The communication network 100 includes a computer network such as the Internet, a core network of a communication carrier, and various local networks. For example, the communication network 100 may be a wireless communication network of a mobile communication scheme such as a 3G scheme, an LTE scheme, or a 4G scheme or may be a wireless communication network of a wireless data communication scheme such as a wireless LAN scheme such as WiFi (registered trademark), a wireless MAN scheme such as WiMAX (registered trademark), or a wireless WAN scheme.

The third communicator 39 can transmit information such as the device ID or the module ID acquired by the reading device 32, the properties, or the like to the cloud server 5 via the communication network 100.

The relay device 4 relays communication between the module 2 or the communication terminal 3 and the cloud server 5. For example, the relay device 4 relays information transmitted from the module 2 or the communication terminal 3 to the cloud server 5. For example, the relay device 4 functions as a gateway.

Hereinafter, the relay device 4 according to an embodiment of the present invention will be described.

Figure 5:
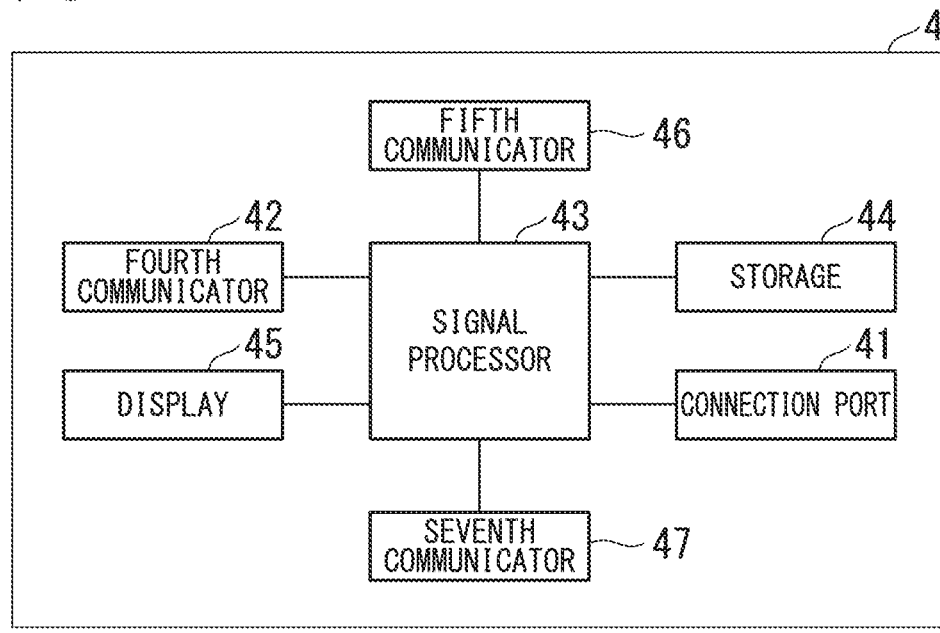
FIG. 5 is a diagram showing an exemplary schematic configuration of a relay device 4 according to an embodiment of the present invention.

FIG. 5 is a diagram showing an exemplary schematic configuration of the relay device 4 according to the embodiment of the present invention.

As shown in FIG. 5, the relay device 4 includes a connection port 41, a fourth communicator 42, a signal processor 43, a storage 44, a display 45, a fifth communicator 46, and a seventh communicator 47.

The connection port 41 is an interface to which a sensor 10 is connected. In the present embodiment, the relay device 4 has one connection port, but the present invention is not limited thereto. For example, the relay device 4 may have no connection port 41 or may have a plurality of connection ports 41.

The fourth communicator 42 wirelessly communicates with the second communicator 38 to transmit or receive information to or from the second communicator 38. For example, the fourth communicator 42 wirelessly communicates with the second communicator 38 to acquire the association information therefrom.

The signal processor 43 stores the association information acquired by the fourth communicator 42 in the storage 44. The signal processor 43 also converts the association information acquired by the fourth communicator 42 into a predetermined format as data for registration in the cloud server 5. For example, the signal processor 43 converts the association information acquired by the fourth communicator 42 into, for example, information of JavaScript (registered trademark) object notation (JSON). Hereinafter, the association information converted into the predetermined format as data for registration in the cloud server 5 is referred to as registration information.

The signal processor 43 transmits the registration information to the first communicator 26 via the seventh communicator 47, such that the registration information is stored in the storage 22 of the module 2.

The signal processor 43 transmits the registration information to the cloud server 5 via the fifth communicator 46 and the communication network 100.

The signal processor 43 can perform conversion of measurement data sent from the sensor 10, statistical processing thereof, taking of correlation data, or the like according to the registration information. The communication schemes of the module 2 and the communication terminal 3 may be the same.

The storage 44 stores a device ID which is identification information uniquely identifying the relay device 4.

The signal processor 43 displays image data of the information code C indicating the device ID stored in the storage 44 on the display 45. The display 45 may be a seal on which the information code C is printed, which may also be printed or engraved directly on the relay device 4.

The signal processor 43 transmits a measurement value transmitted from the module 2 to the cloud server 5 via the fifth communicator 46 and the communication network 100. If necessary, the signal processor 43 also performs processing for converting the measurement value into a communication format suitable for the cloud server 5.

The relay device 4 may acquire power from a commercial power supply which is an external device by inserting a power plug 110 into an outlet (not shown).

The relay device 4 has a hardware key switch for turning on and off the communication function for communication with the communication terminal 3 such that it is possible to limit the communication function when not necessary by manipulating the key switch. Limitation of the communication function using the key switch can reduce the download time as much as possible when measurement data is transmitted to the cloud only through uploading, and therefore it is possible to protect the relay device 4 or the module 2 from infection of a virus or the like, thereby improving security. The cloud server 5 transmits or receives information to or from the communication terminal 3 and the relay device 4 via the communication network 100. The cloud server 5 may transmit or receive information to or from at least one of the communication terminal 3 and the relay device 4 via the communication network 100.

Hereinafter, the configuration of the cloud server 5 according to an embodiment of the present invention will be described.

Figure 6:
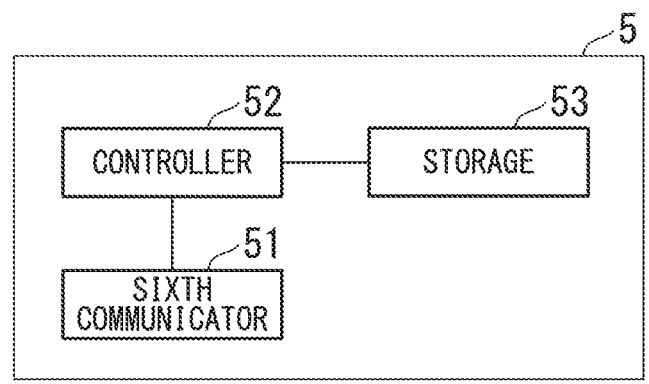
FIG. 6 is a diagram showing an exemplary schematic configuration of a cloud server 5 according to an embodiment of the present invention.

As shown in FIG. 6, the cloud server 5 includes a sixth communicator 51, a controller 52, and a storage 53.

The sixth communicator 51 transmits or receives information to or from the communication terminal 3 and the relay device 4 via the communication network 100. The sixth communicator 51 may transmit or receive information to or from at least one of the communication terminal 3 and the relay device 4 via the communication network 100.

The controller 52 acquires the device ID of the relay device 4 from the communication terminal 3 via the communication network 100. The controller 52 then performs authentication of the relay device 4 on the basis of the device ID acquired from the communication terminal 3. For example, the controller 52 performs authentication of the relay device 4 by comparing and checking the device ID acquired from the communication terminal 3 with the device ID stored in the storage 53. The controller 52 determines that the authentication of the relay device 4 has succeeded when the device ID acquired from the communication terminal 3 matches a device ID stored in the storage 53. On the other hand, the controller 52 determines that the authentication of the relay device 4 has failed when a device ID matching the device ID acquired from the communication terminal 3 is not stored in the storage 53. The device ID stored in the storage 53 is the device ID of the relay device 4 used in the registration system 1, which is stored in advance in the storage 53. As the relay device 4 is authenticated by the controller 52, the cloud server 5 permits the relay device 4 to relay the information transmitted from the module 2 or the communication terminal 3 to the cloud server 5.

The controller 52 acquires registration information from the relay device 4 via the communication network 100.

The controller 52 stores the registration information in the storage 53 to register the sensors 10 connected to the connection ports 21 of each module 2.

Figure 7:
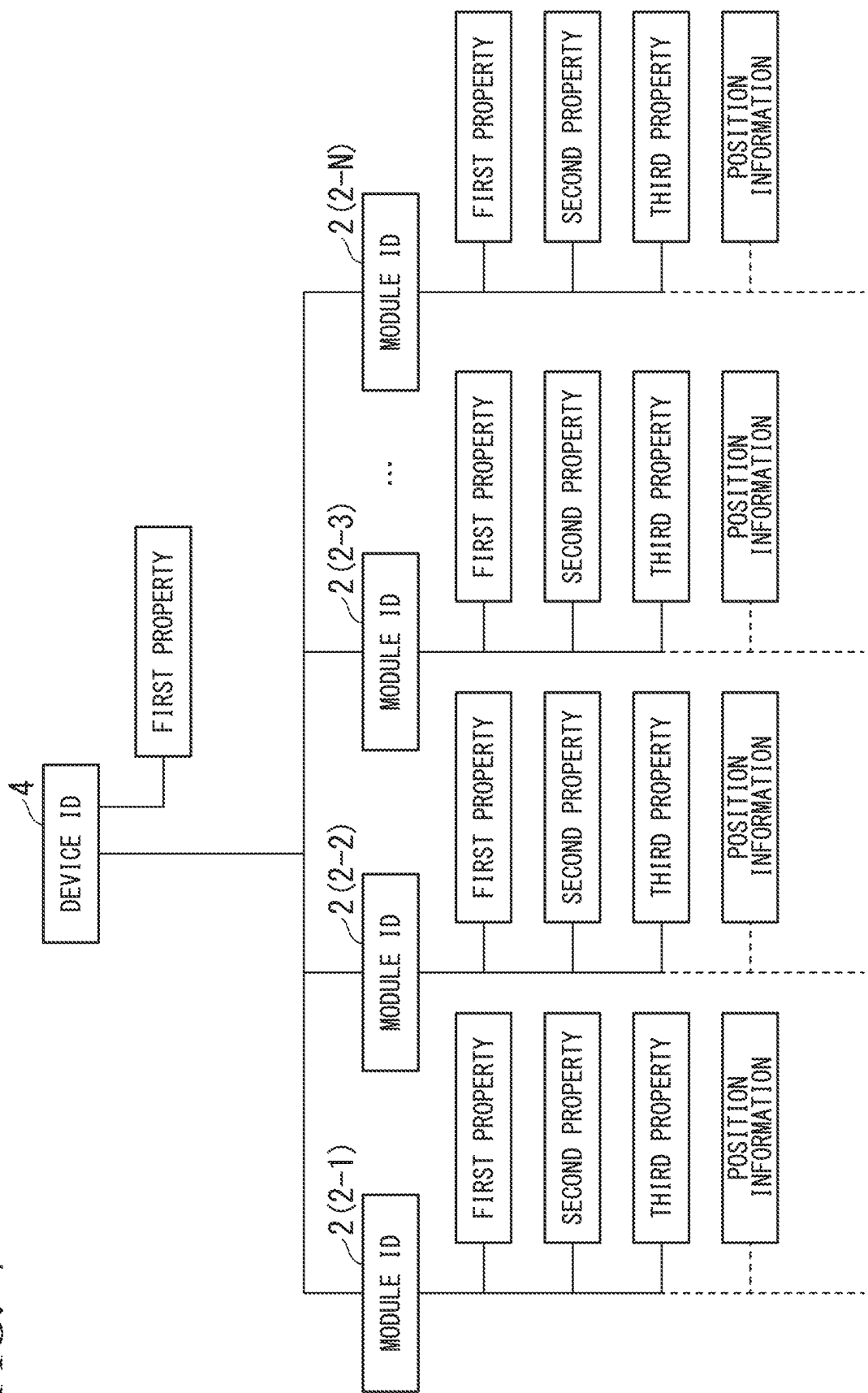
FIG. 7 is a diagram virtually showing a hierarchy of a device ID, module IDs, and properties according to an embodiment of the present invention.

For example, as shown in FIG. 7, using the registration information acquired from the relay device 4, the controller 52 links the device ID of the relay device 4 with the module ID of each module 2 and links the module ID of each module 2 with sensor information of the sensors 10 set as properties of the module ID. By performing this linking, the controller 52 can store measurement values of sensors 10 transmitted from the module 2 via the relay device 4 in the storage 53 for each tenant. Which tenant uses each of the modules 2 and the relay device 4 is preset. For example, this information is recorded in the cloud server 5 when the information code C is issued. The information with regard to a tenant, which uses the relay device 4 displaying the issued information code C, is recorded in the cloud server 5.

Measurement values of sensors 10 stored in the storage 53 will be described below with reference to FIG. 8.

Figure 8:
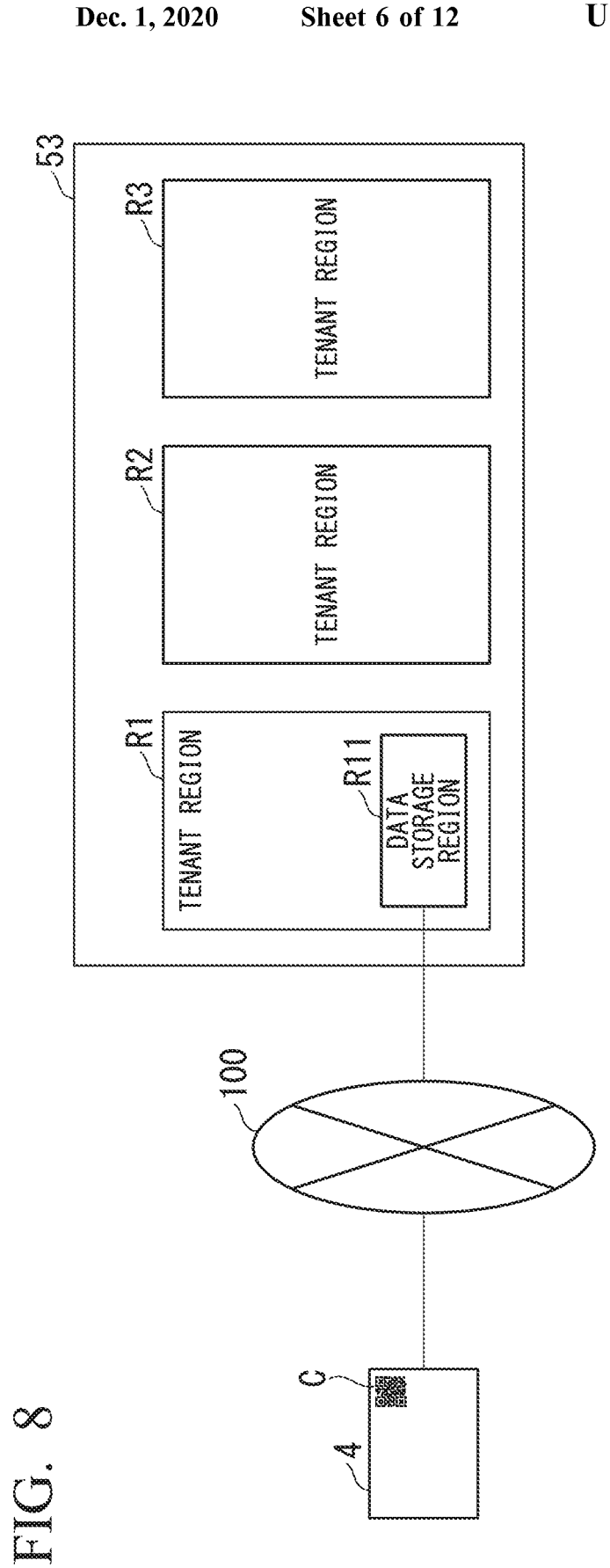
FIG. 8 is a diagram for explaining measurement values of sensors 10 stored in a storage 53 according to an embodiment of the present invention.

As shown in FIG. 8, the storage 53 has tenant areas R1 to R3 respectively for tenants. Although only three tenant areas R1 to R3 are shown here for ease of explanation, the storage 53 has a number of tenant areas corresponding to the number of tenants using the cloud server 5. It is assumed that a tenant area R1 shown in FIG. 8 is a tenant area for a tenant using the sensors 10-1 to 10-3 connected to the module 2-3 shown in FIG. 1. In this case, the controller 52 saves data collected from the sensors 10-1 to 10-3 in the tenant area R1 of the tenant using the sensors 10-1 to 10-3.

The tenant areas may be regions in which constituent elements of a cloud computing environment such as computers, servers, routers, switches, or the like are shared by a plurality of tenants in a system environment to which a cloud computing technology is applied, i.e., in a multitenant-based system environment, and a virtualization technology or the like may be applied to allocate logically divided computer resources to the tenants. Different networks may also be established for the tenants using a virtual local area network (VLAN) or the like and a plurality of logically divided systems (for a plurality of tenants) may be constructed in the system environment.

Figure 9:
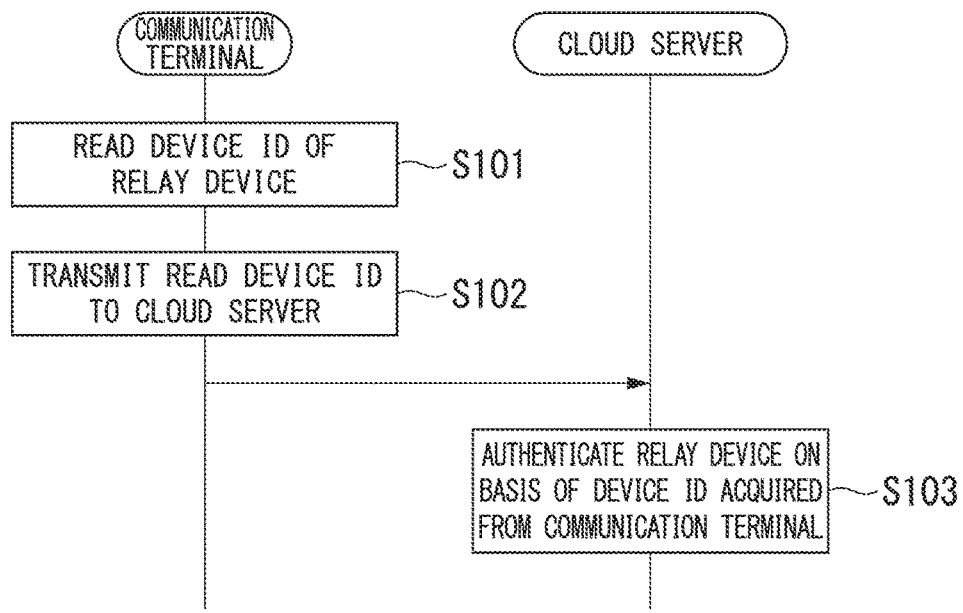
FIG. 9 is a sequence diagram of an authentication process in the registration system 1 according to an embodiment of the present invention.

An authentication method in the registration system 1 according to the present embodiment will be described below with reference to FIG. 9.

According to a manipulation of the user, the communication terminal 3 images the information code C of the relay device 4 and reads the device ID of the relay device 4 from the imaged information code C (step S101).

The communication terminal 3 then transmits the read device ID to the cloud server 5 via the communication network 100 (step S102).

The cloud server 5 performs authentication of the relay device 4 by comparing and checking the device ID acquired from the communication terminal 3 with a device ID stored in the storage 53 (step S103). The controller 52 determines that the authentication of the relay device 4 has succeeded when the device ID acquired from the communication terminal 3 matches the device ID stored in the storage 53. When the authentication of the relay device 4 has succeeded, the cloud server 5 permits the authenticated relay device 4 to transmit registration information. That is, a process of registering the module 2 and the sensors 10 connected to the modules 2 is permitted to be performed.

Figure 10:
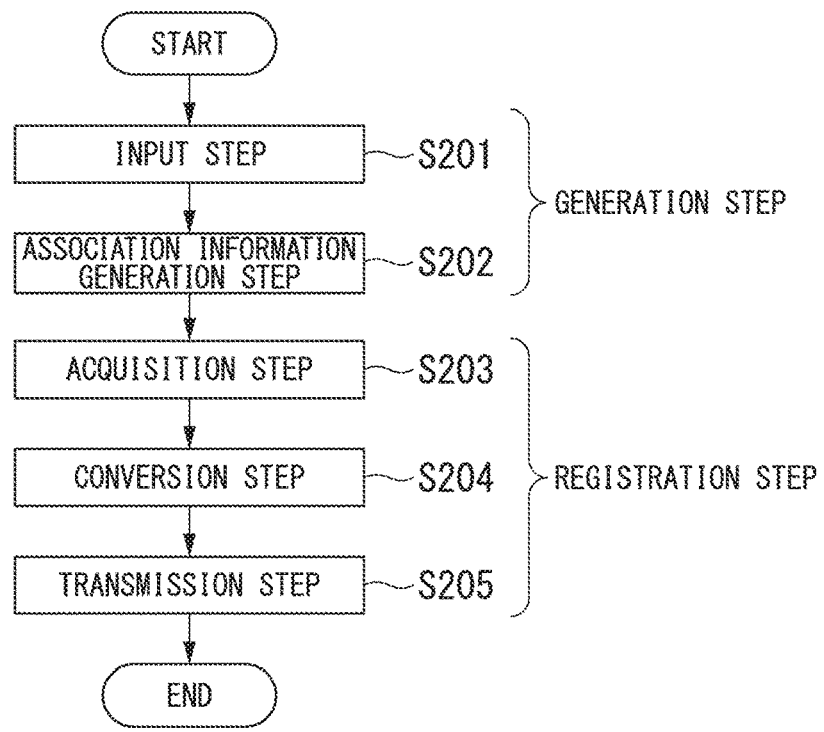
FIG. 10 is a diagram showing a method for registering a sensor 10 in a registration system 1 according to an embodiment of the present invention.

Next, a method for registering sensors 10 according to an embodiment of the present invention will be described with reference to FIG. 10. As shown in FIG. 10, the method for registering sensors 10 according to the embodiment of the present invention includes a generation step and a registration step.

In this generation step, association information which associates port information identifying a connection port 21 to which a sensor 10 is connected and sensor information including the type of the sensor 10 with each other is generated.

Next, in the registration step, the association information generated in the generation step is converted into a predetermined format and then transmitted to the cloud server 5 to register the sensor 10 connected to the connection port 21 in the cloud server 5.

For example, the generation step includes an input step and an association information generation step. The registration step includes an acquisition step, a conversion step, and a transmission step.

In the input step, by manipulating the device information registration page W1 displayed on the communication terminal 3, the user inputs the port information identifying the connection port 21 to which the sensor 10 is connected and the sensor information including the type of the sensor 10 to the communication terminal 3 (step S201).

In the association information generation step, the communication terminal 3 associates the port information identifying the connection port 21 and the sensor information including the type of the sensor 10 input in the input step with each other to generate the association information (step S202).

In the acquisition step, the communication terminal 3 and the relay device 4 communicate with each other such that the relay device 4 acquires the association information generated in the association information generation step from the communication terminal 3 (step S203).

In the conversion step, the relay device 4 converts the association information acquired in the acquisition step into a format for registration in the cloud server 5 (step S204).

In the transmission step, the relay device 4 transmits the association information converted in the conversion step (i.e., registration information) to the cloud server 5 (step S205).

Next, the method for registering sensors 10 according to an embodiment of the present invention will be described in detail with reference to FIG. 11.

Figure 11:
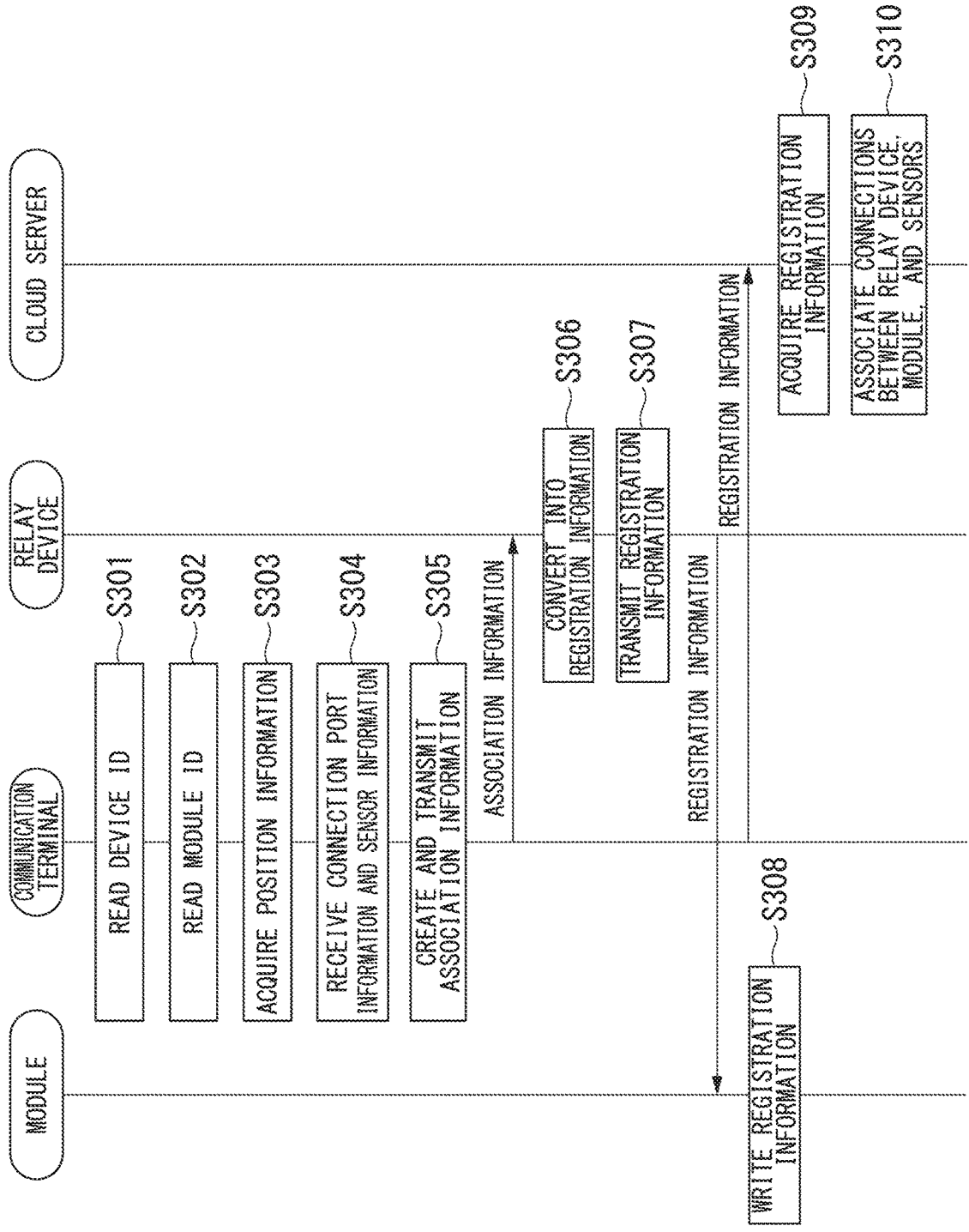
FIG. 11 is a sequence diagram of a process of registering a sensor 10 in a registration system 1 according to an embodiment of the present invention.

FIG. 11 is a sequence diagram of the registration system 1 according to the embodiment of the present invention. It is assumed that wiring and installation of sensors 10 to be registered in the cloud server 5 has been completed. The following description will be given with reference to the case in which the sensors 10-1, 10-2, and 10-3 connected to the connection ports 21a, 21b, and 21c of the module 2-3 are registered in the cloud server 5 for convenience of explanation.

The communication terminal 3 activates a predetermined application and displays the device information registration page W1 on the display 35. When the device ID and GPS acquisition button B1 on the device information registration page W1 is pressed, the communication terminal 3 reads the device ID from the information code C of the relay device 4 (step S301). The communication terminal 3 then registers the device ID of the relay device 4 obtained from the information code C in the storage 37 of the communication terminal 3. This reading allows the relay device 4 to be thereafter selected as an option SL2 for the connection destination of the module 2. Using the same application, the communication terminal 3 images the information code C of the module 2 according to a manipulation of the user and reads the module ID of the module 2 from the imaged information code C (step S302). By defining a relationship between the device ID and the module ID, it is possible to incorporate a mechanism for securing the connection between the relay device 4 and the module 2 and to enable communication between the relay device 4 and the module 2. For example, it is possible to use a method in which the relay device 4 downloads a table of local IP addresses into information of the relay device 4 and allocates an idle IP address to the module 2. When the DHCP is used, it is possible to incorporate the connection authentication for local connections into a similar work.

When reading the module ID in step S302, the communication terminal 3 acquires position information of the communication terminal 3 (step S303). The communication terminal 3 sets respective sensor information of the sensors 10-1 to 10-3 as properties of the read module ID. That is, the device information registration page W1 is a page for associating the connection ports 21a to 21c to which the sensors 10-1 to 10-3 are connected with sensor information including the types of the sensors 10-1 to 10-3.

The communication terminal 3 receives the user input of port information of the connection ports 21a to 21c and sensor information of the sensors 10-1 to 10-3 for the input fields of the device information registration page W1 (through the selection fields SL1 to SL3 thereof) (step S304). Thus, the communication terminal 3 associates the input information of the connection ports 21a to 21c with the input sensor information of the sensors 10-1 to 10-3. Specifically, the communication terminal 3 sets the sensor information of the sensor 10-1 connected to the connection port 21a with the connection port 21a as a first property to generate association information. The communication terminal 3 also sets the sensor information of the sensor 10-2 connected to the connection port 21b with the connection port 21b as a second property to create association information. The communication terminal 3 also sets the sensor information of the sensor 10-3 connected to the connection port 21c with the connection port 21c as a third property to create association information. Then, the communication terminal 3 transmits all created association information to the relay device 4 (step S305).

The relay device 4 stores the association information transmitted from the communication terminal 3 in the storage 44. The communication method between the relay device 4 and the communication terminal 3 and the communication method between the relay device 4 and the module 2 may differ from each other. For example, a relatively fast communication method such as WiFi (registered trademark) may be adopted as the communication method between the relay device 4 and the communication terminal 3 and an LPWAN or the like which restricts the amount of communication to increase battery run-time may be adopted as the communication method between the relay device 4 and the module 2. The relay device 4 converts the association information received from the communication terminal 3 into registration information (step S306). The relay device 4 then transmits the registration information obtained through the conversion to the module 2-3 through wireless communication (step S307). The module 2-3 writes the registration information transmitted from the relay device 4 to the storage 22 (step S308).

In the process of step S307, the relay device 4 also transmits the registration information to the cloud server 5 via the communication network 100.

The cloud server 5 acquires the registration information via the communication network 100 (step S309).

Using the registration information acquired from the relay device 4, the cloud server 5 links the device ID of the relay device 4 with the module ID of the module 2-3 and links the module ID of the module 2-3 with the sensor information of the sensors 10-1 to 10-3 set as properties of the module ID (step S310). This completes registration of the sensors 10-1 to 10-3 in the cloud server 5.

As described above, the registration system 1 for sensors 10 according to the present embodiment includes the module 2 and either the communication terminal 3 or the relay device 4.

The module 2 includes a plurality of connection ports 21 to which the sensors 10 are connected and transmits measurement values measured by the sensors 10 connected to the connection ports 21 to the cloud server 5 via the relay device 4.

The relay device 4 converts the association information which associates the connection ports 21 to which the sensors 10 are connected and the sensor information including the types of the sensors 10 with each other into a predetermined format and transmits the converted association information to the cloud server 5, thereby registering the sensors 10 connected to the connection ports 21 in the cloud server 5.

As a result, even when the communication function of the communication terminal 3 cannot be used at the installation locations of the modules 2, position information or registration information at the site may first be recorded in the storage 37 of the communication terminal 3 for each of the modules 2 and then be collectively registered through the relay device 4 after the communication terminal 3 is moved close to the relay device 4. A function of recording photographs, memos, or the like of situations at the time of installation of the modules 2 as supplementary information of their properties in the communication terminal 3 may be added to the above functions, thus providing an additional function of recording not only the registration information but also the installation situations as supplementary information of the registration information.

Thus, it is possible to easily register unregistered sensors 10 in the cloud server 5 at the site. Therefore, it is possible to make the unregistered sensors 10 available at the site. Even when sensor information of a sensor 10 registered in advance in the cloud server 5 has changed at the site, the sensor information of the sensor 10 can easily be reflected in the cloud server 5 according to the situation of the site. Examples of such reflection of the sensor information according to the situation at this site include an example in which, when preregistered installation position of a sensor 10 installed near a river has changed due to a typhoon, a storm or the like, the position information is accordingly updated or reflected in the cloud server 5 and an example in which, when temperature environments at the installation location of a sensor 10 have changed, the temperature measurement range of the sensor 10 is changed from 200° C. to 300° C. and the changed sensor information is reflected in the cloud server 5.

The above embodiment has been described with regard to the case in which the relay device 4 converts the association information into registration information and transmits the registration information to the cloud server 5, but the present invention is not limited thereto. For example, the communication terminal 3 may convert the association information into registration information and transmit the registration information to the cloud server 5 via the communication network 100.

Figure 12:
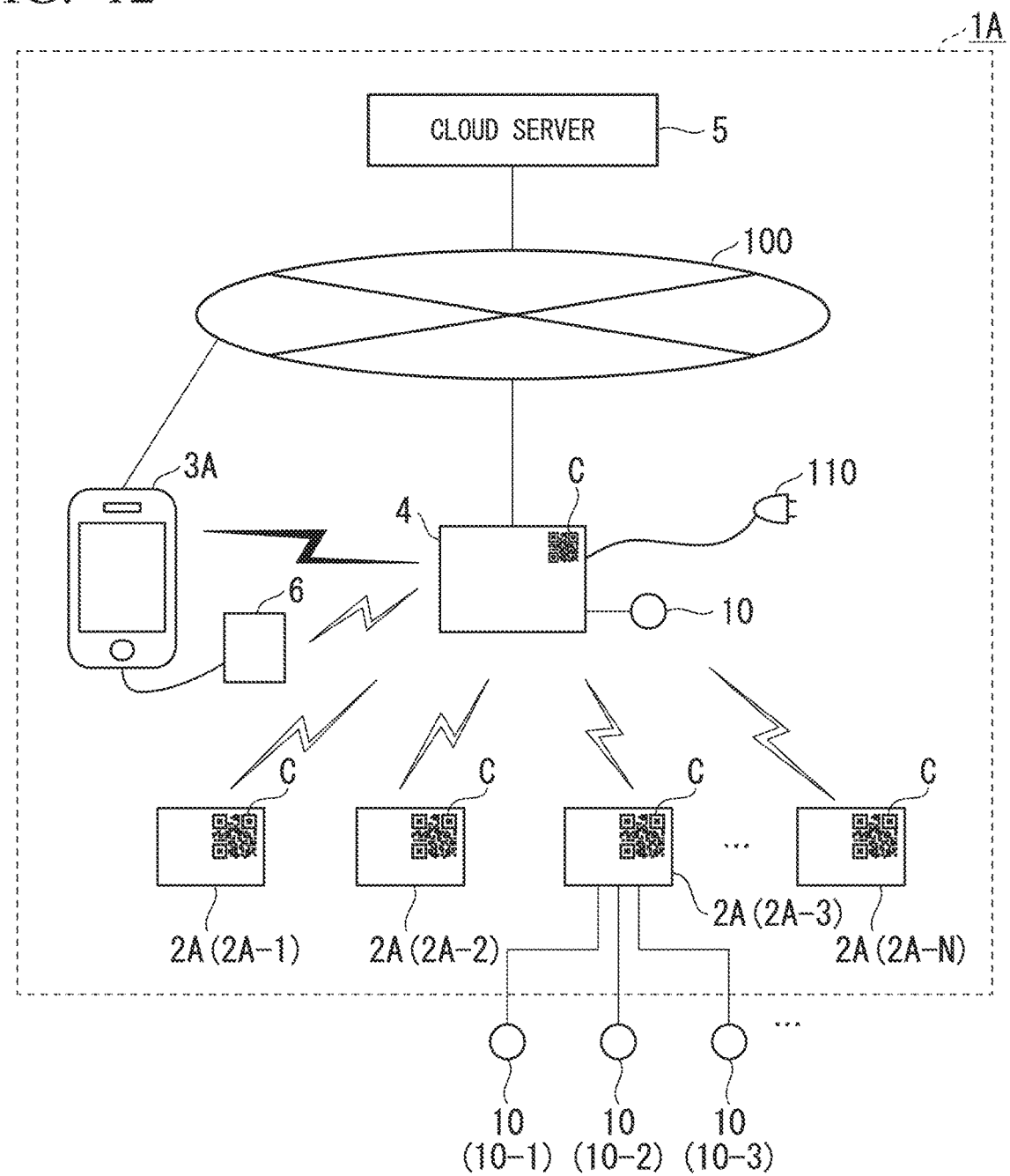
FIG. 12 is a diagram showing an exemplary schematic configuration of a registration system 1A according to a variation of the present invention.

The communication terminal 3 can realize communication with the relay device 4 using a communication method that is not implemented in the communication terminal 3 by attaching an external communication module 6 to the communication terminal 3 as shown in FIG. 12. This method is effective, for example, when using LPWAN communication.

Next, a variation of the registration system 1 according to the present embodiment will be described.

FIG. 12 is a diagram showing an exemplary schematic configuration of a registration system 1A according to this variation. A method of connecting modules 2, a communication terminal 3A, and a relay device 4 using the same communication scheme will be described. Compared with the registration system 1, the registration system 1A of this variation further has a function (a sensor search function) of being able to easily find the installation position of a specific sensor 10 at the site where a plurality of sensors 10 are installed.

As shown in FIG. 12, the registration system 1A includes a plurality of modules 2A (2A-1, 2A-2, 2A-3, 2A-N), the communication terminal 3A, the relay device 4, a cloud server 5, and a communication module 6.

Figure 13:
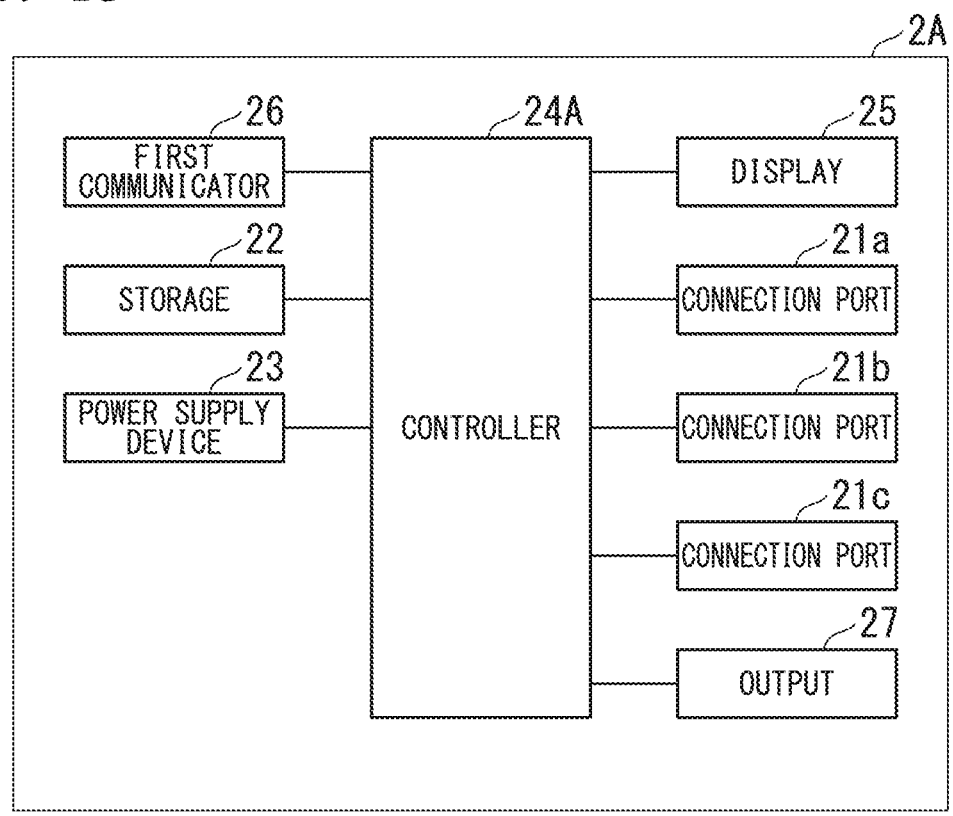
FIG. 13 is a diagram showing an exemplary schematic configuration of a module 2A according to the variation.

As shown in FIG. 13, each of the modules 2A includes a plurality of connection ports 21 (21a, 21b, and 21c), a storage 22, a power supply device 23, a controller 24A, a display 25, a first communicator 26, and an output 27.

The output 27 outputs predetermined information on the basis of an output signal from the controller 24A. For example, the output 27 includes at least one of a buzzer, an indicator lamp, and a speaker. For example, the output 27 lights the indicator lamp on the basis of an output signal (a lighting signal) from the controller 24A to output information. The output 27 sounds a buzzer on the basis of an output signal (a buzzer signal) from the controller 24A to output information.

Upon acquiring a lighting signal from the relay device 4 through the first communicator 26, the controller 24A outputs an output signal to the output 27 to light the indicator lamp. Upon acquiring a buzzer signal from the relay device 4 through the first communicator 26, the controller 24A inputs an output signal into the output 27 to cause the buzzer to output sound.

Next, the communication terminal 3A according to this variation will be described with reference to FIG. 14.

Figure 14:
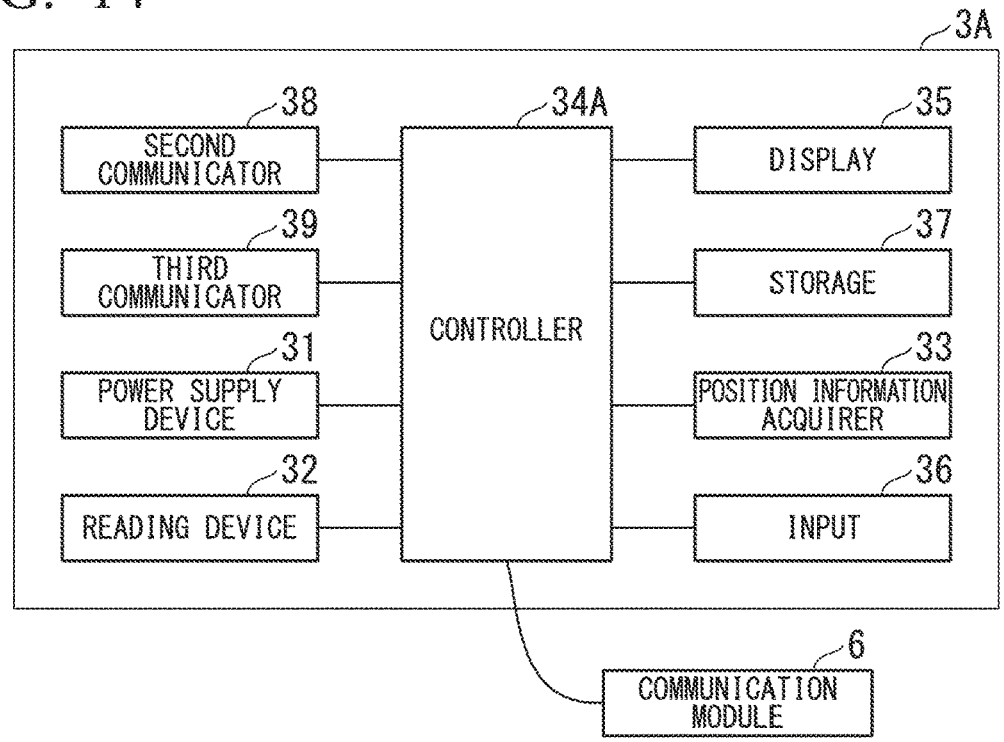
FIG. 14 is a diagram showing an exemplary schematic configuration of a communication terminal 3A according to the variation.

As shown in FIG. 14, the communication terminal 3A includes a power supply device 31, a reading device 32, a position information acquirer 33, a controller 34A, a display 35, an input 36, a storage 37, a second communicator 38, and a third communicator 39.

The controller 34A is connected to the communication module 6. The communication module 6 is applicable to a low-power wide area network (LPWAN). The communication module 6 and the communication terminal 3A may be configured as the same device.

To search for the installation position of the specific sensor 10, the controller 34A executes a process of causing the output 27 of the module 2 to output predetermined information. For example, the controller 34A causes the display 35 to display a sensor search page W2 shown in FIG. 15. Then, the controller 34A executes a process of causing the output 27 of the module 2 to which the sensor 10 specified on the sensor search page W2 is connected to output predetermined information.

Figure 15:
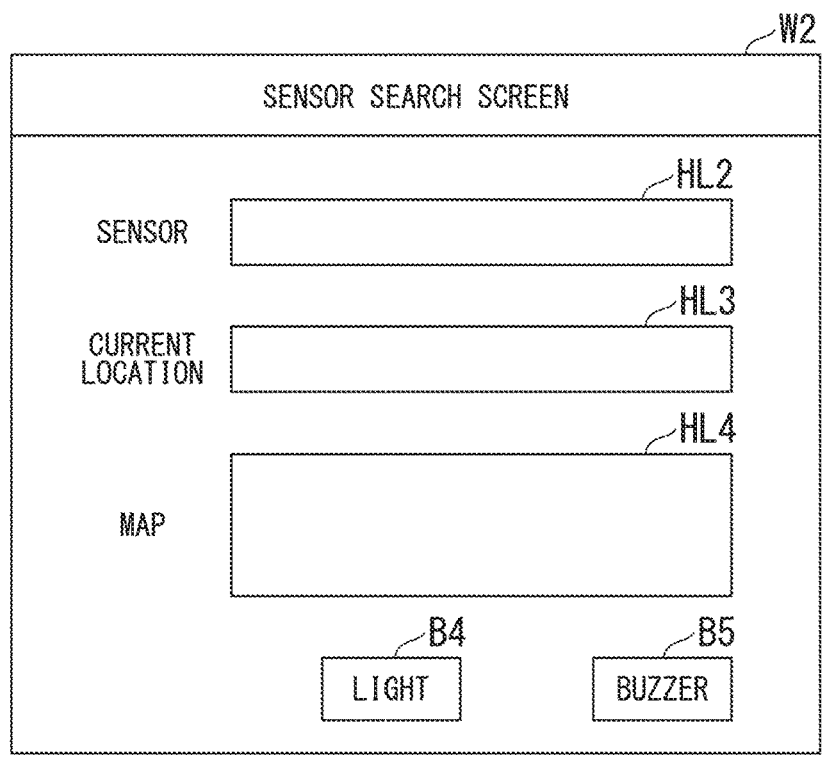
FIG. 15 is a view showing a sensor search page W2 according to the variation.

As shown in FIG. 15, the sensor search page W2 has display fields HL2, HL3, and HL4 and selection buttons B4 and B5.

The installation position of the search target sensor 10 is displayed in the display field HL2. The search target sensor 10 is determined by the user. The installation position is position information acquired by the position information acquirer 33 when the module 2 to which the search target sensor 10 is connected is registered in the cloud server 5.

Current position information of the communication terminal 3A is displayed in the display field HL3. This position information is acquired by the position information acquirer 33. For example, GPS can be used to acquire this position information.

A surrounding map of the communication terminal 3A or the search target sensor 10 is displayed in the display field HL4.

The communication terminal 3A and the installation position of the search target sensor 10 are displayed on the surrounding map.

The storage 37 may store not only the surrounding map of the sensor but also a world map. For example, the controller 34A may display the positions of a plurality of sensors 10 on the world map displayed in the display field HL4 on the basis of the position information acquired by the position information acquirer 33 and the world map stored in the storage 37. The controller 34A may be able to control the display 35 such that the map is displayed enlarged or reduced in the display field HL4 on the basis of an instruction that the user has input through the input 36.

The selection buttons B4 and B5 are buttons for selecting which type of information is to be output from the output 27 of the module 2 connected to the search target sensor 10. In an example shown in FIG. 15, the selection button B4 is a button for selecting "to light the indicator lamp" and the selection button B5 is a button for selecting "to sound the buzzer". The sensor search page W2 shown in FIG. 15 is merely an example, display fields and selection buttons other than the display fields HL2, HL3, and HL4 and the selection buttons B4 and B5 may be prepared, and the arrangement of the display fields HL2, HL3, and HL4 and selection buttons B4 and B5 can be arbitrarily set.

When the selection button B4 is manipulated by the user, the controller 34A transmits a lighting signal indicating that the indicator lamp is to be lit to the module 2 via the communication module 6 and the relay device 4 through. On the other hand, when the selection button B5 is manipulated by the user, the controller 34A transmits a buzzer signal indicating that the buzzer is to be sounded to the module 2 via the relay device 4 through the communication module 6. Information uniquely identifying the search target sensor 10 is assigned to the lighting or buzzer signal. For example, this information may be position information of the search target sensor 10 or property information set as sensor information of the search target sensor 10.

Figure 16:
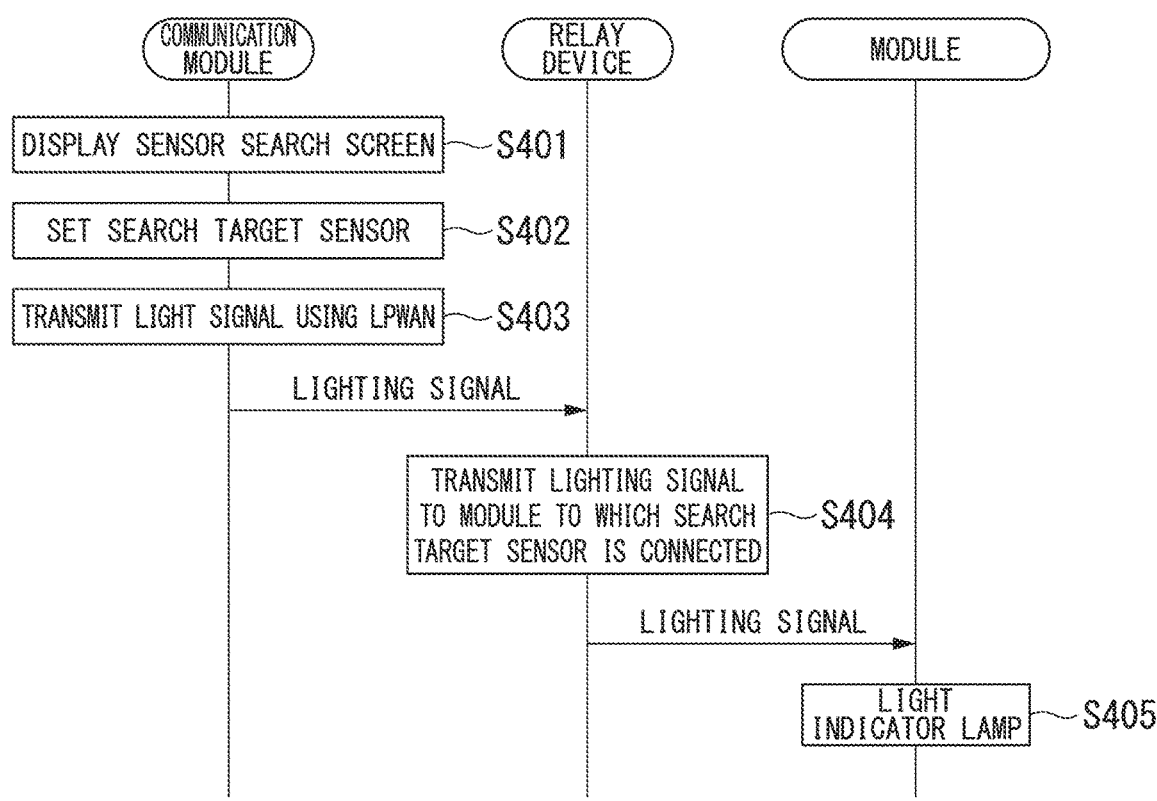
FIG. 16 is a diagram showing a method for searching for a sensor 10 installed at a site in the registration system 1A according to the variation.

Hereinafter, a method for searching for a sensor 10 installed at the site in the registration system 1A according to this variation will be described with reference to FIG. 16.

The user connects the communication module 6 to the communication terminal 3A. The user then manipulates the input 36 while holding the communication terminal 3A to cause the display 35 of the communication terminal 3A to display the sensor search page W2 (step S401). The communication terminal 3A sets the search target sensor 10 on the basis of the user's manipulation (step S402). The communication terminal 3A displays the installation position of the set search target sensor 10 in the display field HL2. The communication terminal 3A also displays the position information of the communication terminal 3A in the display field HL3. The communication terminal 3A then displays a map on which the communication terminal 3A and the installation position of the search target sensor 10 are displayed in the display field HL4. This allows the user to reach near the installation position of the search target sensor 10 while checking the map displayed in the display field HL4.

Even when the user can reach near the installation position of the search target sensor 10 merely by checking the map displayed in the display field HL4, the user sometimes cannot find the search target sensor 10. In that case, the user manipulates at least one of the selection buttons B4 and B5. The following description will be given with reference to the case in which the user manipulates the selection button B4 for convenience of explanation.

When the selection button B4 is manipulated by the user, the communication terminal 3A transmits a lighting signal to the relay device 4 through the communication module 6. That is, when the selection button B4 is manipulated by the user, the communication terminal 3A transmits the lighting signal to the relay device 4 using the low-power wide area network (step S403).

The relay device 4 acquires the lighting signal from the communication terminal 3A through the communication module 6. The relay device 4 then identifies the module 2 to which the search target sensor 10 is connected from the acquired lighting signal. For example, the relay device 4 identifies the module 2 to which the search target sensor 10 is connected from property information assigned to the acquired lighting signal.

The relay device 4 then transmits the lighting signal to the identified module 2 (step S404).

Upon acquiring the lighting signal from the relay device 4, the module 2 to which the search target sensor 10 is connected lights the indicator lamp of the output 27 (step S405). Thus, the user finds the module 2 that is being lit, thereby allowing the user to easily find the search target sensor 10 connected to the module 2.

In the method of searching for the sensor 10 according to this variation, the low-power wide area network is used for communication from the communication terminal 3A to the relay device 4. Therefore, it is possible to easily find the search target sensor 10 even when the search target sensor 10 is installed at the site where cellular phone networks are unavailable.

The above-described communication terminals 3 and 3A are realized by a computer having a communication function. That is, the communication terminals 3 and 3A are constructed by combining hardware components and software components. The software components include an association information generation program for generating association information which associates the connection ports 21 to which the sensors 10 are connected and sensor information including the types of the sensors 10 with each other and a sensor search program for performing the sensor search function.

The hardware components include a ROM that stores the association information generation program and the sensor search program, a CPU that performs information processing on the basis of the association information generation program and the sensor search program, a RAM that temporarily stores processing results of the CPU, an interface circuit which allows the CPU to communicate with the outside, a display device that displays processing results of the CPU, a manipulation device which allows a center manager to input manipulation instructions to the CPU, bus lines which electrically connect the ROM, the CPU, the RAM, the interface circuit, the display device, and the manipulation device to each other, or the like.

Although embodiments of the present invention have been described above in detail with reference to the drawings, the specific configurations thereof are not limited to those of the embodiments and include designs or the like without departing from the spirit of the present invention.

What is claimed is:

1. A sensor registration method, comprising:
    receiving input of port information of a first communication device and sensor information of a sensor, the first communication device comprising at least one connection port, the port information identifying the at least one connection port to which the sensor is connected, the sensor information including a type of the sensor, the reception being performed by using a communication terminal;
    generating association information by associating the received port information with the received sensor information, the association being performed by using the communication terminal;
    converting the association information to have a predetermined format;
    transmitting the converted association information to an information processing device configured to process data obtained from the sensor; and
    registering the sensor in the information processing device by storing the converted association information into the information processing device.

2. The sensor registration method according to claim 1, further comprising:
    communicating, using a relay device configured to relay communication between the first communication device and the information processing device, with the communication terminal to acquire the association information from the communication terminal,
    wherein
    the association information is converted to have a format applicable to registration in the information processing device by the relay device, and
    the converted association information is transmitted to the information processing device by the relay device.

3. The sensor registration method according to claim 1, wherein
    receiving the input of the port information and the sensor information comprises:
        reading first identification information identifying the first communication device using the communication terminal, the first identification information being displayed on the first communication device;
        acquiring position information of the communication terminal using the communication terminal;
        displaying a registration page including the first identification information and the position information on the communication terminal; and
        receiving the input of the port information and the sensor information on the registration page.

4. The sensor registration method according to claim 3, further comprising:
    reading second identification information identifying a relay device using the communication terminal, the relay device being configured to relay communication between the first communication device and the information processing device, the second identification information being displayed on the relay device.

5. The sensor registration method according to claim 3, further comprising:
    receiving input of a connection destination of the first communication device on the registration page.

6. The sensor registration method according to claim 2, wherein
    the information processing device is a cloud server connected to the communication terminal and the relay device via a network.

7. The sensor registration method according to claim 4, wherein
    registering the sensor in the information processing device comprises:
        associating the second identification information with the first identification information; and
        associating the first information with the sensor.

8. A sensor registration system, comprising:
    an information processing device configured to process data obtained from a sensor;
    a first communication device comprising at least one connection port to which the sensor is connected;
    a communication terminal configured to:
        receive input of port information of the first communication device and sensor information of the sensor, the port information identifying the at least one connection port to which the sensor is connected, the sensor information including a type of the sensor; and generates association information by associating the received port information with the received sensor information; and a second communication device configured to:
convert association information to have a predetermined format, the association information associating port information identifying the connection port with sensor information including a type of the sensor; and
transmit the converted association information to the information processing device to register the sensor in the information processing device.

9. The sensor registration system according to claim 8, wherein
the second communication device is a relay device configured to relay communication between the first communication device and the information processing device, and
the communication terminal comprises:
a communicator configured to transmit the generated association information to the relay device.

10. The sensor registration system according to claim 9, wherein
the relay device comprises a signal processor configured to convert the association information acquired from the communication terminal to have the predetermined format and transmit the converted association information to the information processing device.

11. The sensor registration system according to claim 9, wherein
the communication terminal is configured to:
read first identification information identifying the first communication device, the first identification information being displayed on the first communication device;
acquire position information of the communication terminal;
display a registration page including the first identification information and the position information; and
receive the input of the port information and the sensor information on the registration page.

12. The sensor registration system according to claim 11, wherein
the communication terminal is configured to read second identification information identifying the relay device, the second identification information being displayed on the relay device.

13. The sensor registration system according to claim 11, wherein
the communication terminal is configured to receive input of a connection destination of the first communication device on the registration page.

14. The sensor registration system according to claim 9, wherein
the information processing device is a cloud server connected to the communication terminal and the relay device via a network.

15. The sensor registration system according to claim 12, wherein
the information processing device is configured to:
associate the second identification information with the first identification information; and
associate the first information with the sensor.

* * * * *